US009034986B2

(12) United States Patent
Hayashi et al.

(10) Patent No.: US 9,034,986 B2
(45) Date of Patent: May 19, 2015

(54) SOLVENT-FREE CROSSLINKED POLYROTAXANE MATERIAL AND PROCESS FOR PRODUCTION OF SAME

(71) Applicant: Advanced Softmaterials Inc., Kashiwa-shi, Chiba (JP)

(72) Inventors: Yuki Hayashi, Kashiwa (JP); Toru Kobayashi, Koshigaya (JP); Junko Suda, Tsukuba (JP); Michiko Ito, Kitasoma (JP)

(73) Assignee: Advanced Softmaterials Inc., Kashiwa-shi (JP)

( * ) Notice: Subject to any disclaimer, the term of this patent is extended or adjusted under 35 U.S.C. 154(b) by 0 days.

(21) Appl. No.: 14/302,169

(22) Filed: Jun. 11, 2014

(65) Prior Publication Data
US 2014/0296450 A1 Oct. 2, 2014

Related U.S. Application Data

(62) Division of application No. 13/054,923, filed as application No. PCT/JP2009/065157 on Aug. 31, 2009, now Pat. No. 8,785,552.

(30) Foreign Application Priority Data

Sep. 1, 2008 (JP) ................. 2008-223777

(51) Int. Cl.
| | |
|---|---|
| *C08B 31/00* | (2006.01) |
| *C08G 63/91* | (2006.01) |
| *C08G 18/10* | (2006.01) |
| *C08G 18/40* | (2006.01) |
| *C08G 18/42* | (2006.01) |
| *C08G 18/48* | (2006.01) |
| *C08G 18/61* | (2006.01) |
| *C08G 18/75* | (2006.01) |
| *C08G 18/79* | (2006.01) |
| *C08G 83/00* | (2006.01) |

(52) U.S. Cl.
CPC .............. *C08G 63/912* (2013.01); *C08G 18/10* (2013.01); *C08G 18/4018* (2013.01); *C08G 18/4238* (2013.01); *C08G 18/4277* (2013.01); *C08G 18/4833* (2013.01); *C08G 18/61* (2013.01); *C08G 18/757* (2013.01); *C08G 18/792* (2013.01); *C08G 83/007* (2013.01); *C08G 18/48* (2013.01)

(58) Field of Classification Search
CPC .................................................. C08G 83/007
USPC ............... 525/54.21, 54.22, 54.24, 54.3, 403, 525/404, 408
See application file for complete search history.

(56) References Cited

U.S. PATENT DOCUMENTS

| | | |
|---|---|---|
| 6,828,378 B2 | 12/2004 | Okumura |
| 7,622,527 B2 | 11/2009 | Ito |
| 2003/0124168 A1 | 7/2003 | Yui |
| 2009/0011933 A1 | 1/2009 | Ito |
| 2009/0234049 A1 | 9/2009 | Ito |
| 2009/0281213 A1 | 11/2009 | Ito |

FOREIGN PATENT DOCUMENTS

| | | |
|---|---|---|
| JP | 2003-261637 A | 9/2003 |
| JP | 3475252 B2 | 12/2003 |
| JP | 2005-344097 A | 12/2005 |
| JP | 2008-291267 A | 12/2008 |
| WO | 02/02159 A1 | 1/2002 |
| WO | 2005/095493 A1 | 10/2005 |
| WO | 2007026577 A1 | 3/2007 |

OTHER PUBLICATIONS

Araki, J., et al., "Evaluation of Properties of Sliding Graft Copolymer Films," Polymer Preprints, Japan; 55th Society of Polymer Science Japan Symposium on Macromolecules (Toyama, Japan) 55(2):3337-3338, Jan. 2006.
Araki, J., et al., "Preparation of a 'Sliding Graft Copolymer,' an Organic Solvent-Soluble Polyrotaxane Containing Mobile Side Chains, and Its Application for a Crosslinked Elastomeric Supramolecular Film," Soft Matter (Supplementary Material), Nov. 27, 2007, <http://www.rsc.org/suppdata/sm/b7/b715231k/b715231k.pdf [retrieved Apr. 24, 2012], 2 pages.
Araki, J., et al., "Preparation of a 'Sliding Graft Copolymer,' an Organic Solvent-Soluble Polyrotaxane Containing Mobile Side Chains, and its Application for a Crosslinked Elastomeric Supramolecular Film," Soft Matter 4(2):245-249, 2008.
Extended European Search Report mailed Apr. 24, 2012, issued in corresponding International Application No. PCT/JP2009/065157, filed Aug. 31, 2009, 5 pages.
International Search Report mailed Nov. 17, 2009, issued in corresponding International Application No. PCT/JP2009/065157, filed Aug. 31, 2009, 2 pages.

*Primary Examiner* — Robert Jones, Jr.
(74) *Attorney, Agent, or Firm* — Christensen O'Connor Johnson Kindness PLLC

(57) ABSTRACT

A material comprising crosslinked polyrotaxanes which exhibits desired viscoelasticity, particularly stress-strain characteristics with a wide low-stress region, in spite of being free from solvent; and a process for production of the same. The material comprises a first polyrotaxane bearing first cyclic molecules and a second polyrotaxane bearing second cyclic molecules, and the first and second polyrotaxanes are crosslinked via the first and second cyclic molecules. The material is free from solvent and exhibits a stress of 2.0 MPa or below at 50% strain.

14 Claims, 2 Drawing Sheets

SOLVENT-FREE CROSSLINKED POLYROTAXANE MATERIAL AND PROCESS FOR PRODUCTION OF SAME

CROSS REFERENCES TO RELATED APPLICATIONS

This application is a division of U.S. patent application Ser. No. 13/054,923, filed Jan. 19, 2011, which is the National Stage of International Patent Application No. PCT/JP2009/065157, filed Aug. 31, 2009, the disclosures of which are fully incorporated herein expressly by reference.

TECHNICAL FIELD

The present invention relates to a material comprising a crosslinked polyrotaxane having desired viscoelasticity in spite of being free from solvent, and a method of producing the material.

BACKGROUND ART

A polyrotaxane, which is comprised of a pseudopolyrotaxane, which comprises a linear molecule and cyclic molecules in which the linear molecule is included in cavities of cyclic molecules in a skewered manner, and capping groups, each of which locates at each end of the pseudopolyrotaxane in order to prevent the dissociation of the cyclic molecules, has characteristics originating from the relative movement of the cyclic molecule(s) along the linear molecule, and is therefore expected to be useful in various applications (see Patent Document 1).

For example, Patent Document 2 discloses a material comprising a polyrotaxane and a polymer, wherein at least apart of the polyrotaxane and the polymer are bound to each other via a cyclic molecule(s). It is disclosed that the material has superior viscoelasticity, but that the material only provides the viscoelasticity when water is included in the material as solvent.

Further, Patent Document 3 discloses a polyrotaxane, which has a hydrolyzable (biodegradable) property and also is introduced with a biocompatible group, and its crosslinked body (hydrogel). It is disclosed that the crosslinked body (hydrogel) contains water as a solvent, but no description is included regarding viscoelasticity.

Patent Document 4 discloses a polyurethane elastomer having a rotaxane structure in which a linear diol is introduced to a crown ether ring. However, the polyurethane elastomer does not have either the polyrotaxane structure or the crosslinked polyrotaxane structure.

Non-Patent Document 1 discloses that an elastomer is obtained by crosslinking a polycaprolactone-modified polyrotaxane with hexamethylene diisocyanate and removing the solvent. However, as the elastomer exhibits relatively high stress characteristics as stress-strain characteristics, only insufficient characteristics are shown for an application which requires viscoelasticity with higher flexibility.

PRIOR ART DOCUMENT

Patent Document

Patent Document 1: Japanese Patent No. 3475252.
Patent Document 2: WO 2005/095493.
Patent Document 3: WO 2002/002159.
Patent Document 4: JP-A-2003-261637.

Non-Patent Document

Non-Patent Document 1: J. Araki, T. Kataoka, K. ITO, Soft Matter, 2008, 4, 245-249.

DISCLOSURE OF THE INVENTION

Problems to be Solved by the Invention

However, the conventionally available materials are i) those which have desired characteristics in terms of viscoelasticity but contain a solvent, and/or ii) those which do not contain a solvent but have unsatisfactory viscoelasticity. Therefore, a material which has desired viscoelasticity without any solvents, in particular, a material having stress-strain characteristics with a wide low-stress region without any solvents has been required.

An object of the present invention is to provide a material comprising crosslinked polyrotaxanes which exhibits desired viscoelasticity, in particular, stress-strain characteristics with a wide low-stress region without any solvents.

Further, another object of the present invention is to provide a method of producing the material having the above-described properties.

Means for Solving Problems

The present inventors have found following inventions:

<1> A material comprising a first polyrotaxane and a second polyrotaxane, wherein the first polyrotaxane comprises a first pseudopolyrotaxane, which has a first linear molecule and a first cyclic molecule(s) in which the first linear molecule is included in a cavity (cavities) of the first cyclic molecule(s) in a skewered manner, and first capping groups, each of which locates at each end of the first pseudopolyrotaxane in order to prevent the dissociation of the first cyclic molecule(s), the second polyrotaxane comprises a second pseudopolyrotaxane, which has a second linear molecule and a second cyclic molecule(s) in which the second linear molecule is included in a cavity (cavities) of the second cyclic molecule(s) in a skewered manner, and second capping groups, each of which locates at each end of the second pseudopolyrotaxane in order to prevent the dissociation of the second cyclic molecule(s), the first and second polyrotaxanes are crosslinked with each other via the first and second cyclic molecules, the material is free from solvent, and the material has a stress at 50% strain ($\delta 50$) of 2.0 MPa or less, preferably 1.5 MPa or less, more preferably 1.0 MPa or less.

<2> In the above item <1>, the material may have a stress at 100% strain ($\delta 100$) of 2.5 MPa or less, preferably 2.0 MPa or less, more preferably 1.5 MPa or less.

<3> In the above item <1> or <2>, the material may have breaking extension ratio of more than 100%, preferably more than 200%, more preferably more than 400%.

<4> In any one of the above items <1> to <3>, a stress gradient $\Delta S$, which is represented by $(\delta 100-\delta 50)/\delta 50$, may be 1.0 or less.

<5> In any one of the above items <1> to <4>, $\delta 50$ may range from 0.01 to 0.50 MPa, $\Delta S$ may range from 0.02 to 0.30, and the breaking extension ratio may be more than 800%.

<6> In any one of the above items <1> to <4>, $\delta 50$ may range from 0.20 to 0.70 MPa, $\Delta S$ may range from 0.15 to 0.70, and the breaking extension ratio may range from more than 200% to 800%.

<7> In any one of the above items <1> to <4>, δ50 may range from 0.60 to 2.0 MPa, ΔS may range from 0.50 to 1.0, and the breaking extension ratio may range from more than 100% to 200%.

<8> In any one of the above items <1> to <7>, each of the first and second cyclic molecules may have a first active group and a second active group, respectively, the crosslinked body may have a crosslinking moiety which is bound to the first cyclic molecule and the second cyclic molecule, the crosslinking moiety may have a first reactive group and a second reactive group, each of which is reactive with the first active group and the second active group, respectively, and the crosslinking moiety may have a polymeric moiety comprising repeating units of 10 or more, preferably 20 or more, more preferably 40 or more between the first and second reactive groups.

<9> In the above item <8>, the polymeric moiety may have molecular weight of 1,000 or more, preferably 2,000 or more, more preferably 3,000 or more.

<10> In any one of the above items <1> to <7>, each of the first and second cyclic molecules may have a first active group and a second active group, respectively, the crosslinked body may have a crosslinking moiety which is bound to the first cyclic molecule and the second cyclic molecule, the crosslinking moiety may have a first reactive group and a second reactive group, each of which is reactive with the first active group and the second active group, respectively, the crosslinking moiety may have a polymeric moiety having molecular weight of 1,000 or more, preferably 2,000 or more, more preferably 3,000 or more between the first and second reactive groups.

<11> In any one of the above items <8> to <10>, each of the first and second reactive groups may have two functional groups or more.

<12> In any one of the above items <8> to <11>, the active group may be derived from a group selected from the group consisting of —OH, —SH, —NH$_2$, —COOH, —SO$_3$H, and —PO$_4$H.

<13> In any one of the above items <8> to <12>, the reactive group may be selected from the group consisting of an isocyanate group, a thioisocyanate group, an oxirane group, an oxetane group, a carbodiimide group, a silanol group, an oxazoline group, and an aziridine group.

<14> In any one of the above items <11> to <13>, the two functional groups or more may be two groups or more selected from the group consisting of an isocyanate group, a thioisocyanate group, an oxirane group, an oxetane group, a carbodiimide group, a silanol group, an oxazoline group, and an aziridine group.

<15> In any one of the above items <8> to <14>, the polymeric moiety may have a plurality of polymers and a linker moiety linking the plurality of polymers.

<16> In any one of the above items <8> to <15>, the polymeric moiety may have a branched chain.

<17> In the above item <16>, the branched chain may be in any one of the plurality of polymers and/or in the linker moiety.

<18> In any one of the above items <8> to <17>, the polymeric moiety may be polyether, polyester, polysiloxane, polycarbonate, poly(meth)acrylate or polyene, or copolymer thereof.

<19> In any one of the above items <8> to <18>, the active group may be derived from an —OH group, the reactive group or the functional group may be an isocyanate group, the polymeric moiety may be polyether, polyester or polysiloxane.

<20> In any one of the above items <1> to <19>, each of the first and second cyclic molecules may be selected from the group consisting of α-cyclodextrin, β-cyclodextrin and γ-cyclodextrin.

<21> In any one of the above items <1> to <20>, each of the first and second linear molecules may be selected from the group consisting of polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. And more specifically, the linear molecule may be selected from the group consisting of polyethylene glycol, polypropylene glycol, polytetrahydrofuran, polydimethylsiloxane, polyethylene and polypropylene, and preferably polyethylene glycol.

<22> In any one of the above items <1> to <21>, each of the first and second linear molecules may have a molecular weight of 3,000 to 1,000,000, preferably 5,000 to 500,000, more preferably 10,000 to 300,000.

<23> In any one of the above items <1> to <22>, each of the first and second capping group may be selected from the group consisting of dinitrophenyl groups; cyclodextrins; adamantane groups; trityl groups; fluoresceins; pyrenes; substituted benzenes (examples of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, each of the first and second capping group may be selected from the group consisting of dinitrophenyl groups; cyclodextrins; adamantane groups; trityl groups; fluoresceins; and pyrenes, more preferably adamantane groups; or trityl groups.

<24> In any one of the above items <1> to <23>, the first and second cyclic molecules may be derived from α-cyclodextrin, and the first and second linear molecule may be polyethylene glycol.

<25> In any one of the above items <1> to <24>, each of the first and second linear molecule may have the first and second cyclic molecule included in a skewered manner at an amount of 0.001 to 0.6, preferably 0.01 to 0.5, more preferably 0.05 to 0.4 of a maximum inclusion amount, which is defined as an amount at which the first and second cyclic molecules can be included at maximum when the first and second linear molecule has the first and second cyclic molecules included in a skewered manner, and the amount at maximum is normalized to be 1.

<26> A method for producing a material comprising a first polyrotaxane and a second polyrotaxane, wherein the first and second polyrotaxanes are crosslinked with each other, the material is free from solvent, and the material has a stress at 50% strain of 2.0 MPa or less, preferably 1.5 MPa or less, more preferably 1.0 MPa or less;

the method comprising the steps of:

a) preparing the first polyrotaxane, wherein the first polyrotaxane comprises a first pseudopolyrotaxane, which has a first linear molecule and a first cyclic molecule(s) in which the first linear molecule is included in a cavity (cavities) of the first cyclic molecule(s) in a skewered manner, and first capping groups, each of which locates at each end of the first pseudopolyrotaxane in order to prevent the dissociation of the first cyclic molecule(s), and the first cyclic molecule has a first active group;

b) preparing the second polyrotaxane, wherein the second polyrotaxane comprises a second pseudopolyrotaxane, which has a second linear molecule and a second cyclic molecule(s) in which the second linear molecule is included in a cavity (cavities) of the second cyclic molecule(s) in a skewered manner, and second capping groups, each of which locates at each end of the second pseudopolyrotaxane in order to prevent the dissociation of the second cyclic molecule(s), and the second cyclic molecule has a second active group; and c) mixing and reacting i) the first polyrotaxane; ii) the second polyrotaxane; and iii) a crosslinking compound, which has a first reactive group and a second reactive group, each of which is reactive with the first and second active groups, respectively, and which has a polymeric moiety comprising repeating units of 10 or more, preferably 20 or more, more preferably 40 or more between the first and second reactive groups, to obtain the material.

<27> In the above item <26>, the polymeric moiety may have molecular weight of 1,000 or more, preferably 2,000 or more, more preferably 3,000 or more.

<28> A method for producing a material comprising a first polyrotaxane and a second polyrotaxane, wherein the first and second polyrotaxanes are crosslinked with each other, the material is free from solvent, and the material has a stress at 50% strain of 2.0 MPa or less, preferably 1.5 MPa or less, more preferably 1.0 MPa or less;

the method comprising the steps of:

a) preparing the first polyrotaxane, wherein the first polyrotaxane comprises a first pseudopolyrotaxane, which has a first linear molecule and a first cyclic molecule(s) in which the first linear molecule is included in a cavity (cavities) of the first cyclic molecule(s) in a skewered manner, and first capping groups, each of which locates at each end of the first pseudopolyrotaxane in order to prevent the dissociation of the first cyclic molecule(s), and the first cyclic molecule has a first active group (referred to as an active hydrogen atom);

b) preparing the second polyrotaxane, wherein the second polyrotaxane comprises a second pseudopolyrotaxane, which has a second linear molecule and a second cyclic molecule(s) in which the second linear molecule is included in a cavity (cavities) of the second cyclic molecule(s) in a skewered manner, and second capping groups, each of which locates at each end of the second pseudopolyrotaxane in order to prevent the dissociation of the second cyclic molecule(s), and the second cyclic molecule has a second active group (referred to as an active hydrogen atom); and c) mixing and reacting i) the first polyrotaxane; ii) the second polyrotaxane; and iii) a crosslinking compound, which has a first reactive group and a second reactive group, each of which is reactive with the first and second active groups, respectively, and which has a polymeric moiety having molecular weight of 1,000 or more, preferably 2,000 or more, more preferably 3,000 or more between the first and second reactive groups, to obtain the material.

<29> In any one of the above items <26> to <28>, prior to the step c), the method may further comprise a step of d) preparing the crosslinking compound.

<30> In the above item <29>, the step d) may be a step of reacting the polymeric moiety having a portion on which the reactive group can be introduced with a compound having two reactive group or more, to obtain the crosslinking compound.

<31> In the above item <29>, the step d) may be a step of introducing the reactive group upon polymerizing monomers which will become the polymeric moiety, to obtain the crosslinking compound.

Effects of the Invention

The present invention can provide a material comprising a material comprising crosslinked polyrotaxanes which exhibits desired viscoelasticity, in particular, stress-strain characteristics with a wide low-stress region, without any solvents.

Further, the present invention can provide a method of producing the material having the above-described properties.

EMBODIMENTS FOR CARRYING OUT THE INVENTION

Figure 1:
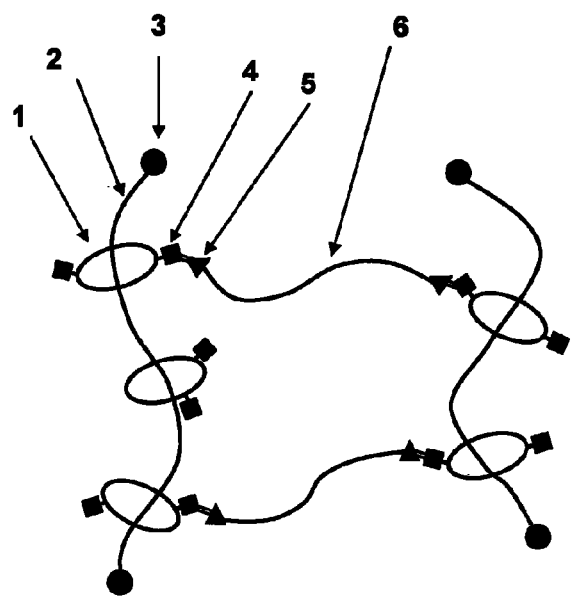
FIG. 1 is a schematic diagram illustrating a material according to the present invention.

The present invention will be described in detail hereinafter.

The present invention provides a material comprising a first polyrotaxane and a second polyrotaxane, wherein the first and second polyrotaxanes are crosslinked with each other via the first and second cyclic molecules, the material is free from solvent, and the material has a stress at 50% strain ($\delta 50$) of 2.0 MPa or less, preferably 1.5 MPa or less, more preferably 1.0 MPa or less.

The material according to the present invention, which comprises a first polyrotaxane and a second polyrotaxane, can exhibit stress-strain characteristics with a wide low-stress region, without any solvents.

The term "free from solvent" used herein means that absolutely no solvent is present. However, it may comprise a tiny amount of solvent, i.e., 3 wt % or less (when the whole material is 100 wt %), and preferably 1 wt % or less. Furthermore, it means that the material according to the present invention may comprise a solvent during production, treatment or processing under general conditions, but the solvent amount in the final material is still within the above range.

The material according to the present invention has a stress at 50% strain of 2.0 MPa or less, preferably 1.5 MPa or less, and more preferably 1.0 MPa or less.

Further, the material according to the present invention has a stress at 100% strain of 2.5 MPa or less, preferably 2.0 MPa or less, and more preferably 1.5 MPa or less.

The material having the stress at 50% strain and 100% strain within the range described above can provide a material having the stress-strain characteristics with a wide low-stress region, according to the present invention.

More, the material according to the present invention has the breaking extension ratio of more than 100%, preferably more than 200%, and more preferably more than 400%.

Herein, the breaking extension ratio can be expressed with the following equation, wherein Lt represents the effective length at the time of breaking, and Lo represents the effective length before extending.

$$\text{Breaking extension ratio}(\%) = \{(Lt-Lo)/Lo\} \times 100.$$

Further, the material according to the present invention may have 1.0 or less of a stress gradient $\Delta S$, represented by $(\delta 100 - \delta 50)/\delta 50$.

In one embodiment of the material according to the present invention, $\delta 50$ may range from 0.01 to 0.50 MPa, $\Delta S$ may range from 0.02 to 0.30, and the breaking extension ratio may be more than 800%.

In another embodiment of the material according to the present invention, $\delta 50$ may range from 0.20 to 0.70 MPa, $\Delta S$ may range from 0.15 to 0.70, and the breaking extension ratio may range from more than 200% to 800%.

Further, in one embodiment of the material according to the present invention, $\delta 50$ may range from 0.60 to 2.0 MPa, $\Delta S$ may range from 0.50 to 1.0, and the breaking extension ratio may range from more than 100% to 200%.

The material according to the present invention having the above-described characteristics may be used for wide applications based on the excellent viscoelasticity that is not found for existing elastomers such as urethane elastomer and rubber elastomer. For example, it is expected to achieve relaxation of the stress applied on the material in accordance with the movement of a first cyclic molecule(s) and/or a second cyclic molecule(s).

Accordingly, it is expected that the material according to the present invention may be used for an adhesive composition, adhesives, an anti-scratch film, and a material for preventing vibration and/or damping vibration and/or isolating vibration, and the like. Further, by taking an advantage of the stress-strain characteristics with a wide low stress region, application in a material for a low-operation voltage actuator or other piezoelectric element is highly expected. On the other hand, a favorable elastomer having low stress characteristics but with sufficient mechanical strength and high extension ratio can be achieved by using a polyrotaxane.

More, by combining with other polymeric materials, the stress relaxing characteristic can be given to the entire material and the improvement of brittleness, extension ratio, hardness, and the like of the material can be achieved, for example.

The material according to the present invention will be explained in more detail.

Each of a first polyrotaxane and a second polyrotaxane has the constitution as follows. Specifically, a first (second) polyrotaxane is comprised of a first (second) pseudopolyrotaxane, which comprises a first (second) linear molecule and a first (second) cyclic molecule(s) in which the linear molecule is included in cavities of cyclic molecules in a skewered manner, and a first (second) capping group which locates at each end of the first (second) pseudopolyrotaxane in order to prevent the dissociation of the first (second) cyclic molecule(s).

A first polyrotaxane and a second polyrotaxane may be the same or different. In brief, according to the invention, it is necessary that at least two polyrotaxane molecules are present and at least two of them are crosslinked.

Furthermore, the elements which constitute a first (second) polyrotaxane, i.e., a first (second) cyclic molecule(s), a first (second) linear molecule and a first (second) capping group, will be described below.

The material according to the present invention is constituted by crosslinking the first polyrotaxane and the second polyrotaxane via their each cyclic molecule(s).

Specifically, each of the first cyclic molecule(s) and the second cyclic molecule(s) has a first active group and a second active group, respectively. A crosslinked body comprises a crosslinking moiety which binds to the first cyclic molecule(s) and the second cyclic molecule(s), wherein the crosslinking moiety comprises a first reactive group and a second reactive group which reacts with the first active group and the second active group, respectively, and the crosslinking moiety comprises a polymeric moiety placed between the first reactive group and the second reactive group.

The above constituents will be described in view of FIG. 1.

FIG. 1 is a drawing which schematically shows the material according to the present invention.

In FIG. 1, linear molecule 2 is included in cavities of cyclic molecule 1 in a skewered manner. At both ends of linear molecule 2, capping group 3 is placed in order to prevent the dissociation of cyclic molecules 1 from the inclusion state, to form a polyrotaxane.

According to the binding between cyclic molecules 1 via the crosslinking moiety, a crosslinked polyrotaxane is formed from the polyrotaxanes. The crosslinking moiety comprises a polymeric moiety 6 and reactive groups 5 at both ends of the moiety. Further, the cyclic molecules comprise active groups 4. According to the reaction between reactive groups 5 and active groups 4, and via cyclic molecules 1 and crosslinking moiety (polymeric moiety 6 and reactive groups 5), the crosslinked polyrotaxane is formed.

The "polymeric moiety" comprises repeating units of 10 or more, preferably 20 or more, more preferably 40 or more, and/or may have molecular weight of 1,000 or more, preferably 2,000 or more, more preferably 3,000 or more. Furthermore, although the repeating units of the "polymeric moiety" may be interrupted by a certain spacer, the repeating units between a first reactive group and a second reactive group may be within the range described above. Further, regarding the molecular weight of the "polymeric moiety," although the polymeric moiety may be interrupted by a certain spacer, the molecular weight between the first reactive group and the second reactive group may be within the range described above.

For example, the polymeric moiety may have a plurality of polymers and a linker moiety linking the polymers. Even in such case, the repeating units and/or the molecular weight between the first reactive group and the second reactive group may be within the range described above.

The polymeric moiety may have a branched chain. In such case, the branched chain may be included in any one of a plurality of polymers and/or a linker moiety.

The polymeric moiety may be derived from a single type of monomer or at least two types of monomer.

Examples of the polymeric moiety or the polymeric moiety having a first reactive group and a second reactive group may include polyether, polyester, polysiloxane, polycarbonate, poly(meth)acrylate or polyene, or copolymer thereof or mixture thereof.

More specific examples may include, but are not limited to, polyethers such as polyethylene glycol diol, polyethylene glycol dicarboxylic acid terminated, polyethylene glycol dithiol acid terminated, polypropylenediol, polytetrahydrofuran, poly(tetrahydrofuran)bis(3-aminopropyl) terminated, polypropylene glycol bis(2-aminopropylether), glycerol propoxylate, glycerol tris[poly(propylene glycol)amino terminated], pentaerythritol ethoxylate, pentaerythritolpropoxylate and the like; polyesters such as poly(ethylene adipate), poly(1,3-propylene adipate)diol terminated, poly(1,4-butylene adipate)diol terminated, poly lactone and the like; polyenes such as modified polybutadiene, modified polyisoprene and the like; and siloxanes such as polydimethylsiloxane disilanol terminated, polydimethylsiloxane hydrogen terminated, polydimethylsiloxane bis(aminopropyl) terminated, polydimethylsiloxane diglycidyl ether terminated, polydimethylsiloxane dicarbinol terminated, polydimethylsiloxane divinyl terminated, polydimethylsiloxane dicarboxylic acid terminated and the like. In particular, the polymeric moiety is preferably either polyethers or polyesters.

The polymeric moiety may have a reactive group at its both ends based on the reaction between a group contained in the polymeric moiety and a certain group. Examples of imparting the "reactive group" by using the "certain group" may include, but are not limited to, imparting an isocyanate group by using a polyfunctional isocyanate such as hexamethylene diisocyanate, a biuret type, an isocyanurate type and an adduct type of hexamethylene diisocyanate, tolylene 2,4-diisocyanate, isophorone diisocyane, trimethylhexamethylene diisocyanate, xylylene diisocyanate, 1,3-bis(isocyanatomethyl)cyclohexene, (4,4'-methylenedicyclohexyl)diisocyanate and the like; imparting an oxirane group by using an oxirane compound such as epichlorohydrin, epibromohydrin and the like; imparting an oxetane group by using an oxetane compound such as 3-(chloromethyl)-3-methyloxetane and the like; imparting an oxazoline group by using 2,2'-bis(2-oxazoline) and the like; and imparting an aziridine group by using a polyfunctional aziridine PZ-33, DZ-22E (manufactured by Nippon Shokubai Co., Ltd) and the like.

The reactive group may include the above-described groups, and may be selected from the group consisting of an isocyanate group, a thioisocyanate group, an oxirane group, an oxetane group, a carbodiimide group, a silanol group, an oxazoline group, and an aziridine group.

Each of the first and second reactive groups may have two functional groups or more, respectively.

The two functional groups or more may be two groups or more selected from the group consisting of an isocyanate group, a thioisocyanate group, an oxirane group, an oxetane group, a carbodiimide group, a silanol group, an oxazoline group, and an aziridine group.

Hereinafter, elements constituting the polyrotaxane will be described respectively.

<<Cyclic Molecule>>

The cyclic molecule is not particularly restricted as long as a linear molecule is included in cavities of the cyclic molecules in a skewered manner, and the cyclic molecule has an active group.

Examples of the active group may be derived from a group selected from the group consisting of —OH, —SH, —NH$_2$, —COOH, —SO$_3$H, and —PO$_4$H The cyclic molecule may be, for example, selected from the group consisting of α-cyclodextrin, β-cyclodextrin and γ-cyclodextrin. A part of —OH groups in α-cyclodextrin and the like may be substituted with other group(s), for example, the above-described group. Furthermore, the cyclic molecule may have a group(s) other than the above-described active group.

Examples of the group(s) other than the above-described active group may include an acetyl group, a propionyl group, a hexanoyl group, a methyl group, an ethyl group, a propyl group, a 2-hydroxypropyl group, a 1,2-dihydroxypropyl group, a cyclohexyl group, a butylcarbamoyl group, a hexylcarbamoyl group, a phenyl group, a polycaprolactone group, an alkoxy silane group, an acryloyl group, a methacryloyl group or a cinnamoyl group, or derivatives thereof. These groups on the cyclic molecules can achieve, for a step of producing a crosslinked body, for example, an improvement in solubility of the polyrotaxane in a solvent, an improvement in compatibility with the polymeric moiety, and imparting a certain functional property to the crosslinked body (for example, a water repellent and oil repellent function, a friction controlling function, a photocuring function, a surface adherence improving function, and the like).

<<Linear Molecule>>

The linear molecule of a polyrotaxane according to the present invention is not limited as long as the linear molecule may be included in a cavity (cavities) of the cyclic molecule(s) in a skewered manner.

For example, the linear molecule may include polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. More specifically, the linear molecule may be selected from the group consisting of polyethylene glycol, polypropylene glycol, polytetrahydrofuran, polydimethylsiloxane, polyethylene and polypropylene, and preferably polyethylene glycol.

A molecular weight of the linear molecule may be 3,000 to 1,000,000, preferably 5,000 to 500,000, more preferably 10,000 to 300,000.

In the first (second) polyrotaxane according to the present invention, the first (second) cyclic molecule may be derived from α-cyclodextrin, and the first (second) linear molecule may be polyethylene glycol.

The linear molecule may have the cyclic molecules included in a skewered manner at an amount of 0.001 to 0.6, preferably 0.01 to 0.5, and more preferably 0.05 to 0.4 of a maximum inclusion amount, which is defined as an amount at which the cyclic molecules can be included at maximum when the linear molecule has the cyclic molecules included in a skewered manner, and the amount at maximum is normalized to be 1.

The maximum inclusion amount of a cyclic molecule can be determined depending on the length of a linear molecule and the thickness of a cyclic molecule. For example, when the linear molecule is polyethylene glycol and the cyclic molecule is α-cyclodextrin molecule, the maximum inclusion amount is measured experimentally (see, Macromolecules 1993, 26, 5698-5703, whole contents of which are incorporated herein by reference).

<<Capping Group>>

The capping group of the polyrotaxane according to the present invention is not limited, as long as the group is located at both ends of a pseudopolyrotaxane, and the group has an action of preventing dissociation of a cyclic molecule(s) from a linear molecule.

For example, the capping group may be selected from the group consisting of dinitrophenyl groups; cyclodextrins; adamantane groups; trityl groups; fluoresceins; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

The material according to the present invention can be applied to adhesives, glues, an anti-scratch film, a material for preventing vibration and/or damping vibration and/or isolating vibration, and the like. Further, by taking an advantage of the stress-strain characteristics with a wide low stress region, application in a material for a low-operation voltage actuator or other piezoelectric element is highly expected. On the other hand, a favorable elastomer having low stress characteristics but with sufficient mechanical strength and high extension ratio can be achieved by using the polyrotaxane according to the present invention.

Further, the material according to the present invention can be applied to paints, coating agents, sealing materials, ink additives, ink binders, electrically insulating materials, materials for electrical/electronic parts, optical materials, friction control agents, cosmetic materials, rubber additives, rheology control agents, thickening agents, fibers (as an additive), medical biomaterials, materials for mechanic and/or automobile, building materials, garment, sports goods, and the like.

<A Method of Producing the Material According to the Present Invention>

The material according to the present invention as described above can be obtained by, for example, the following method:

The method comprises the steps of:

a) preparing the first polyrotaxane, wherein the first polyrotaxane comprises a first pseudopolyrotaxane, which has a first linear molecule and a first cyclic molecule(s) in which the first linear molecule is included in a cavity (cavities) of the first cyclic molecule(s) in a skewered manner, and first capping groups, each of which locates at each end of the first pseudopolyrotaxane in order to prevent the dissociation of the first cyclic molecule(s), and the first cyclic molecule has a first active group;

b) preparing the second polyrotaxane, wherein the second polyrotaxane comprises a second pseudopolyrotaxane, which has a second linear molecule and a second cyclic molecule(s) in which the second linear molecule is included in a cavity (cavities) of the second cyclic molecule(s) in a skewered manner, and second capping groups, each of which locates at each end of the second pseudopolyrotaxane in order to prevent the dissociation of the second cyclic molecule(s), and the second cyclic molecule has a second active group; and c) mixing and reacting i) the first polyrotaxane; ii) the second polyrotaxane; and iii) a crosslinking compound, which has a first reactive group and a second reactive group, each of which is reactive with the first and second active groups, respectively, and which has a polymeric moiety comprising repeating units of 10 or more, preferably 20 or more, more preferably 40 or more between the first and second reactive groups, to obtain the material according to the present invention.

The steps a) and b) are a step of preparing a polyrotaxane. The polyrotaxane can be obtained by referring to documents published before filing the present application (for example, WO2005-080469 and WO2005-108464 (whole contents thereof are incorporated herein by reference)). In a case where the first and second polyrotaxane are same, the steps a) and b) may be carried out in one step. Furthermore, each of the first and second polyrotaxane has the same definition as described above.

The step c) is a step of mixing and reacting iii) a crosslinking compound, and i) the first polyrotaxane and ii) the second polyrotaxane; to crosslink the first and second polyrotaxane, thereby to obtain the material according to the present invention.

The crosslinking compound has a first reactive group and a second reactive group; and a polymeric moiety between the first and second reactive groups.

Each of the first and second reactive groups has the same definition as described above.

The polymeric moiety has the same definition as described above, and may comprise repeating units of 10 or more, preferably 20 or more, more preferably 40 or more between the first and second reactive groups, and/or may have molecular weight of 1,000 or more, preferably 2,000 or more, more preferably 3,000 or more.

The reaction of the step C) may be, in general, carried out in a solvent. Examples of the solvent may include, but are not limited to, dimethyl acetamide, dimethyl formamide, tetrahydrofuran, ethyl acetate, butyl acetate, toluene, xylene, acetonitrile, cyclohexanone, methylethyl ketone or acetone, or mixture thereof, depending on a first polyrotaxane and a second polyrotaxane, and a crosslinking compound, and. Further, conditions may be, but are not limited thereto, room temperature to 100° C. for 5 minutes to 24 hours in the presence of a catalyst, and the like, depending on the reactive group, active group or solvent.

In a case where a solvent is used, various drying steps may be included after step c) in order to obtain the solvent-free material comprising the crosslinked body. More, the method may comprise a step of substituting the solvent with another solvent prior to the step of drying, in order to perform the drying step efficiently.

Examples of the drying step may include, but are not limited to, drying by natural drying based on maintaining at room temperature, drying by heating under normal pressure, drying by heating under reduced pressure, freeze drying, and the like.

The present method may further comprise other steps other than the steps a) to c). For example, the present method may further comprise a drying step after step c) described above, a step of preparing the crosslinking compound used in step c), a step of adding other components to the material during step c) and/or after step c), and a step of washing by using any solvent(s) after the step c), and the like. Examples of the other components may include, but are not limited to, other polymer or oligomer, a plasticizer, a low molecular weight crosslinking agent, a surfactant, an UV absorbent, an antimicrobial agent, and the like.

Examples of other polymer or oligomer among the other components may include, but are not limited to, polyethylene glycol monomethyl ether, polyethylene glycol monobutyl ether, polyethylene glycol dimethyl ether, polypropylene glycol monobutyl ether, mono-hydroxy-terminated polycaprolactone, polycaprolactone, polydimethylsiloxane, mono-hydroxy-terminated polydimethylsiloxane, polycarbonate, mono-hydroxy-terminated polycarbonate, polyester, one-end hydroxylated polyester and the like. Furthermore, other polymer or oligomer may have only one site to which the reactive group can be added, or they may have none. By adding the polymer or oligomer, viscoelasticity of the material according to the present invention may be suitably adjusted.

Examples of the plasticizer among the other components may include, but are not limited to, dibutyl phthalate, di-2-ethylhexyl phthalate, butyl benzyl phthalate, dihexyl phthalate, dioctyl adipate, bis(2-ethylhexyl) adipate, tris(2-ethylhexyl)trimellitate, tricresyl phosphate and the like.

Examples of the low molecular weight crosslinking agent among the other components may include, but are not limited to, chlorocyanurate, trimesoyl chloride, terephthaloyl chloride, epichlorohydrin, dibromobenzene, glutaraldehyde, aliphatic polyfunctional isocyanate, aromatic polyfunctional isocyanate, tolylene diisocyanate, hexamethylene diisocyanate, divinylsulfone, 1,1'-carbonyl diimidazole, acid anhydrides such as ethylene diamine tetraacetic acid dianhydride, meso-butane-1,2,3,4-tetracarboxylic acid dianhydride, polyfunctional acid hydrazines, polyfunctional carboimides, alkoxysilanes, and derivatives thereof.

Examples of the surfactant among the other components may include, but are not limited to, nonionic surfactants such as polyoxyethylene(8) octyl phenyl ether, sorbitan polyoxyethylene trioleate, sorbitan polyoxyethylene monostearate and the like; and ionic surfactants such as sodium dodecyl sulfate, sodium dodecyl sulfonate, triethanolamine dodecyl sulfate, dodecyltrimethylammonium salts, dodecylpyridinium chloride and the like.

Examples of the UV absorbent among the other components may include, but are not limited to, 2-ethylhexyl paradimethylamino benzoate, 2-ethylhexyl salicylate, 2,4-dihydroxybenzophenone, 2-hydroxy-4-n-octylbenzophenone, 2-(2'-hydroxy-5'-t-butylphenyl)benzotriazole, bis(2,2,6,6-tetramethyl-4-piperidyl)sebacate, 2-ethylhexyl paramethoxycinnamate, isopropyl paramethoxycinnamate, ethylhexyl methoxycinnamate and octyl methoxycinnamate.

Examples of the antimicrobial agent among the other components may include, but are not limited to, a silver, a zinc, a copper compound, or complex or ions thereof; an organo silicon compound; an organo phosphorus compound; and the like.

Examples of the viscosity adjusting agent among the other components may include, but are not limited to, carboxyvinyl polymers, propylene glycol alginate, ethylcellulose, sodium carboxymethylcellulose, polyacrylic acid sodium and the like.

Examples of the inorganic fine particles among the other components may include, but are not limited to, silica, alumina, titanium oxide, silicon carbide and the like.

In the step of producing the crosslinking compound, the crosslinking compound can be obtained by adding a reactive group to the "polymeric moiety" or to the "polymeric moiety having a first reactive group and a second reactive group" which has been described above. Examples of the step may include, but are not limited to, i) a step of reacting a polymer having a site to which a reactive group may be added with a compound having at least two reactive groups, to obtain the crosslinking compound; and ii) a step of producing a polymeric moiety by polymerizing monomers in accordance with a common method, and during the step, imparting a compound which becomes the reacting group; and the like. Furthermore, the monomer used herein may be a monomer having repeating units.

For the above step i), after a compound having at least two reactive groups are reacted in excess with a polymer, the reaction product may be used as it is or after purification. Examples of the compound having at least two reactive groups may include, but are not limited to, the compounds described in detail above ([0035]) regarding the impartment of the "reactive group" using a "certain group".

Specific examples of the above step ii) may include, but are not limited to, a crosslinking compound obtained by adding glycidyl methacrylate for polymerization of methyl (meth) acrylic acid, a crosslinking compound obtained by adding α-methacryloyloxy-γ-butyrolactone for polymerization of methyl (meth)acrylic acid, a crosslinking compound obtained by condensation polymerization of ethylene glycol and adipic acid to have a terminal carboxylic acid group, and a crosslinking compound obtained by polyaddition of triethylene glycol and hexamethylene diisocyanate to have a terminal isocyanate group.

EXAMPLES

The present invention will be illustrated more specifically by way of following Examples, but is not limited thereby.

Synthetic Example 1

Preparation of a Polyrotaxane Having a Hydroxypropyl Group and an Acetyl Group

A compound (hereinafter, abbreviating hydroxypropylated polyrotaxane as "HAPR35") obtained by hydroxypropylating a polyrotaxane formed of a linear molecule: polyethylene glycol (average molecular weight: 35,000), a cyclic molecule: α-CD, and a capping group: an adamantane amine group was prepared in a manner similar to the method described in WO2005-080469 (whole contents thereof are incorporated herein by reference) (α-CD inclusion amount: 25% determined by $^1$H-NMR analysis; introduction ratio of hydroxypropyl group: 48%; weight-average molecular weight, Mw determined by GPC: 150,000).

3.0 g of HAPR35 as obtained above was dissolved in 45 ml of a dehydrated N,N-dimethylacetamide (DMA), 0.6 ml of triethylamine and 0.70 ml of acetic anhydride (25 mol % based on the number of the hydroxyl group in HAPR35) were added in order thereto, and then the reaction was carried out for 5 hours. After that, the solution was added dropwise to hexane (360 ml), and the precipitates were dialyzed using a dialysis tube (fractionation molecular weight; 12,000) for 24 hours against flowing tap water. More, it was repeated twice for three hours using purified water. The freeze drying was performed and the resulting product (i.e., acetylated product of HAPR, and hereinafter, the "acetylated product of HAPR35" may be generally abbreviated as "E2-HAPR35") was 3.0 g. GPC determined that the weight-average molecular weight, Mw, was 150,000 and that the molecular weight distribution, Mw/Mn, was 1.2. As a result of thermal analysis using TG/DTA (differential type thermal analyzer, Rigaku TG8120-1C), the decomposition temperature was 346° C. (in air). $^1$H-NMR (DMSO-$d_6$) determined that the acetylation ratio based on the number of whole hydroxyl groups, i.e., the acetylation ratio was 25% when the number of hydroxyl groups derived from α-CD is 100%.

Furthermore, the measurement of the molecular weight and the molecular weight distribution of the synthesized polyrotaxane was carried out by using TOSOH HLC-8220 GPC instrument. The measurement was carried out under the conditions: column: TSK guard column Super AW-H and TSKgel Super AWM-H (two columns are linked); elution solution: dimethylsulfoxide/0.01 M LiBr; column oven: 50° C.; flow rate: 0.5 ml/min; sample concentration of about 0.2 wt/vol %; injection amount: 20 μl; pre-treatment: filtration using a 0.2 μm filter; and the standard molecular weight: PEO (it is the same for Synthetic Examples 2 to 5). $^1$H-NMR analysis was carried out by using 400 MHz JEOL JNM-AL400 (manufactured by JEOL Ltd.) (it is the same for Synthetic Examples 2 to 5).

Synthetic Example 2

Preparation of a Polyrotaxane Having a Hydroxypropyl Group and a Polycaprolactone Group 1.0 g of HAPR35 obtained in Synthetic Example 1 was placed in a three-necked flask, and while nitrogen was slowly flowed in, 4.5 g of ε-caprolactone was introduced therein. The mixture was uniformly stirred at 80° C. for 30 minutes using a mechanical stirrer, and then the reaction temperature was raised to 100° C. 0.16 g of tin 2-ethylhexanoate (50 wt % solution) which had been diluted in advance with toluene, was added to the flask, the reaction was continued for 5 hours, and then solvent was removed from the system, to obtain 5.5 g of a reaction product (in which a polycaprolactone group is introduced to HAPR35, and hereinafter, abbreviating "polycaprolactone group introduced to HAPR35" as "HAPR35-g-PCL"). The product was analyzed by IR, and a peak originating from an ester at 1736 cm$^{-1}$ was observed. More, GPC determined that the weight average molecular weight, Mw, was 586,800, and the molecular weight distribution, Mw/Mn, was 1.7.

Synthetic Example 3

Preparation of a Polyrotaxane Having an Acetyl Group and a Polycaprolactone Group A polyrotaxane (hereinafter, abbreviating the polyrotaxane as "APR35") formed of a linear molecule: polyethylene glycol (average molecular weight: 35,000), a cyclic molecule: α-CD, and a capping group: an adamantane amine group was prepared in a manner similar to the method described in WO2005-052026 (whole contents thereof are incorporated herein by reference) (α-CD inclusion amount: 25%; weight-average molecular weight, Mw determined by GPC: 110,000).

10 g of APR35 was placed in a three-necked flask, and then, dissolved in 200 ml of a 4% solution of lithium chloride in dehydrated dimethylformamide. To the resulting solution, 1.7 g of 4-dimethylaminopyridine was added, 4.3 ml of triethylamine and 2.6 ml of acetic anhydride (20 mol % based on the hydroxyl groups in APR35) were added in order, and then the reaction was carried out for 5 hours at room temperature. The reaction solution was dialyzed using a dialysis tube (fractionation molecular weight; 12,000) for 48 hours under flowing tap water. More, it was repeated twice for three hours using purified water. After the filtration (Kiriyama 5A), the freeze drying was performed, to obtain 9.1 g of the product in which a part of —OH groups of α-CD is substituted with an acetyl group (i.e., APR35 to which an acetyl group is introduced, and hereinafter, the "APR35 to which an acetyl group is introduced" may be generally abbreviated as "E2APR35"). Based on the integral ratio according to $^1$NMR signals between —CH$_3$ of an acetyl group at 2 ppm and the proton of APR35 at 3 to 6.2 ppm, the introduction ratio of the acetyl group was 17% (ratio based on the whole hydroxyl groups in polyrotaxane). GPC determined that the weight-average molecular weight, Mw, was 115,000 and that the molecular weight distribution, Mw/Mn, was 1.4.

To a three-neck flask, 1.0 g of dried E2APR35 was added and 4.5 g of ε-caprolactone and 1.0 g of dimethylacetamide were also introduced while nitrogen was slowly flowed into the flask. After homogenous stirring at 80° C. for 30 minutes using a mechanical stirrer, the reaction temperature was raised to 100° C., added with 0.16 g of tin 2-ethylhexanoate (50 wt % solution) which had been diluted with toluene in advance and reacted for 5 hours. After removing the solvent, 5.4 g of the reaction product (i.e., E2APR35 to which a polycaprolactone group is introduced, and hereinafter, the "E2APR35 to which a polycaprolactone group is introduced" is generally abbreviated as "E2APR35-g-PCL") was obtained. As a result of IR measurement, the peak derived from an ester was observed at 1736 cm$^{-1}$. Further, GPC determined that the weight-average molecular weight, Mw, was 510,000 and that the molecular weight distribution, Mw/Mn, was 1.5. Furthermore, the IR measurement was carried out by using Nicolet 4700 (manufactured by Thermo Fisher Scientific K.K.) (it is the same for Synthetic Examples 4 and 5).

Synthetic Example 4

Synthesis of Polyrotaxane Having a 1,2-Dihydroxypropyl Group and a Polycaprolactone Group In a three-neck flask, 50 g of APR35 was dissolved in 250 ml of 1.5 N NaOH aqueous solution. To the resulting solution, 250 ml of glycidol (Wako Pure Chemical Industries, Ltd.) was slowly added dropwise, and the reaction was carried out for 24 hours at room temperature. The reaction solution was neutralized with hydrochloric acid, and then dialyzed using a dialysis tube (fractionation molecular weight; 12,000) for 48 hours under flowing tap water. More, it was repeated twice for three hours using purified water. After the filtration (Kiriyama 5A), the freeze drying was performed, to obtain 48 g of the product in which a part of —OH groups of α-CD is substituted with a 1,2-dihydroxypropyl group (hereinafter, the "APR35 to which a 1,2-dihydroxypropyl group is introduced" is generally abbreviated as "GAPR35"). Based on the integral ratio according to $^1$NMR (DMSO-$d_6$) between the proton derived from Cl—H and the hydroxyl groups of α-CD and from the hydroxyl group of the glycidol at 4-6 ppm and the proton derived from polyethylene glycol, α-CD and glycidol at 3-4 ppm, the introduction ratio of the 1,2-dihydroxypropyl group was 44% (ratio based on the whole hydroxyl groups in polyrotaxane). GPC determined that the weight-average molecular weight, Mw, was 165,000 and that the molecular weight distribution, Mw/Mn, was 1.3.

To a three-neck flask, 1.0 g of dried GAPR35 was added and 4.5 g of ε-caprolactone was also added while nitrogen was slowly flowed into the flask. After homogenous stirring at 80° C. for 30 minutes using a mechanical stirrer, the reaction temperature was raised to 100° C., added with 0.16 g of tin 2-ethylhexanoate (50 wt % solution) which had been diluted with toluene in advance and reacted for 5 hours. After removing the solvent, 5.3 g of the reaction product (i.e., GAPR35 to which a polycaprolactone group is introduced, and hereinafter, the "GAPR35 to which a polycaprolactone group is introduced" is generally abbreviated as "GAPR35-g-PCL") was obtained. As a result of IR measurement, the peak derived from an ester was observed at 1736 cm$^{-1}$. Further, GPC determined that the weight-average molecular weight, Mw, was 590,500 and that the molecular weight distribution, Mw/Mn, was 1.5.

Synthetic Example 5

Synthesis of Polyrotaxane Having a Hydroxy Propyl Group and a Group Consisting of a Copolymer of ε-Caprolactone and α-Methyl-γ-Butyrolactone To a three-neck flask, 1.0 g of dried HAPR35 was added and a mixture of 4.3 g of ε-caprolactone and 0.2 g of α-methyl-γ-butyrolactone was also added while nitrogen was slowly flowed in. After homogenous stirring at 80° C. for 30 minutes using a mechanical stirrer, the reaction temperature was raised to 100° C., added with 0.16 g of tin 2-ethylhexanoate (50 wt % solution) which had been diluted with toluene in advance and reacted for 5 hours. After removing the solvent, 5.3 g of the reaction product (i.e., HAPR35 to which a group consisting of a copolymer of ε-caprolactone and α-methyl-γ-butyrolactone is introduced, and hereinafter, the "HAPR35 to which a group consisting of a copolymer of ε-caprolactone and α-methyl-γ-butyrolactone is introduced" is generally abbreviated as "HAPR35-g-P(CL-MBL)") was obtained. As a result of IR measurement, the peak derived from an ester was observed at 1736 cm$^{-1}$. Further, GPC determined that the weight-average molecular weight, Mw, was 550,000 and that the molecular weight distribution, Mw/Mn, was 1.6.

Synthetic Example 6

Preparation of Polymeric Moiety (Crosslinking Compound) Having a Reactive Group: Preparation of Siloxane 1000 Having Isocyanate Groups 1.0 ml of 1,3-bis(isocyanatomethyl)cyclohexane was added to a flask equipped with a stirrer, a dropping funnel and a nitrogen injection tube, and a solution in which 2.5 ml of polydimethylsiloxane having an aminopropyl group at both ends (molecular weight: 1,000) is mixed with 6.0 ml of dehydrated toluene was added to the dropping funnel, and then stirring was initiated. To the flask, the toluene solution of polydimethylsiloxane was added dropwise over one hour, followed by stirring further for three hours after the dropwise addition, to obtain a compound having isocyanate groups in a siloxane chain structure.

Example 1

Preparation of Crosslinked Body A-1 Comprising E2-HAPR35 and Polypropylene Glycol Having Isocyanate Groups 1.5 g of E2-HAPR35 obtained in Synthetic Example 1, 2.0 g of polypropylene glycol of which terminal is modified with tolylene 2,4-diisocyanate (Mn=2300, Aldrich Co.) and 10 ml of dimethylformamide (DMF) were homogeneously mixed, defoamed, and then injected to a mold having a sheet shape with thickness of 0.8 mm and reacted at 60° C. The resulting sheet was subjected to the solvent substitution with toluene or acetone, and then dried, to obtain solvent-free, crosslinked body A-1 having a sheet shape. Furthermore, regarding the solvent-free, crosslinked body A-1 was subjected to vacuum drying at 40 to 80° C. (depending on the solvent used), and the weight of crosslinked body A-1 was precisely measured every hour. Then, those showing no weight change was determined as the solvent-free (it is the same for the followings).

Example 2

Preparation of a Crosslinked Body A-2 Comprising E2-HAPR35 and Polypropylene Glycol Having Isocyanate Groups A solvent-free, crosslinked body A-2 having a sheet shape was obtained in a manner similar to Example 1, except that an amount of polypropylene glycol of which terminal is modified with tolylene 2,4-diisocyanate was changed from 2.0 g in Example 1 to 1.5 g.

Example 3

Preparation of a Crosslinked Body A-3 Comprising E2-HAPR35 and Polypropylene Glycol Having Isocyanate Groups A solvent-free, crosslinked body A-3 having a sheet shape was obtained in a manner similar to Example 1, except that an amount of polypropylene glycol of which terminal is modified with tolylene 2,4-diisocyanate was changed from 2.0 g in Example 1 to 1.0 g.

Example 4

Preparation of a Crosslinked Body A-4 Comprising E2-HAPR35 and Poly(Ethyleneadipate) Having Isocyanate Groups 2.0 g of E2-HAPR35 obtained in Synthetic Example 1, 1.5 g of poly(ethyleneadipate) of which terminal is modified with tolylene 2,4-diisocyanate (Mn=2700, Aldrich Co.) and 10 ml of DMF were homogeneously mixed, defoamed, and then injected to a mold having a sheet shape with thickness of 0.8 mm and reacted at 60° C. The resulting sheet was subjected to the solvent substitution with toluene or acetone, and then dried, to obtain solvent-free, crosslinked body A-4 having a sheet shape.

Example 5

Preparation of a Crosslinked Body A-5 Comprising E2-HAPR35 and Poly(Ethyleneadipate) Having Isocyanate Groups A solvent-free, crosslinked body A-5 having a sheet shape was obtained in a manner similar to Example 4, except that an amount of poly(ethyleneadipate) of which terminal is modified with tolylene 2,4-diisocyanate was changed from 1.5 g in Example 4 to 1.0 g.

Example 6

Preparation of Crosslinked Body A-6 Comprising HAPR35-g-PCL and Polypropylene Glycol Having Isocyanate Groups To 2 g of a xylene solution (35 wt %) containing HAPR35-g-PCL obtained in Synthetic Example 2, 0.4 g of polypropylene glycol of which terminal is modified with tolylene 2,4-diisocyanate (Mn=2300, Aldrich Co.) was added and mixed. After removing the air bubble by ultrasonication or reducing the pressure, the mixture was flowed into a sample mold and maintained at 60° C. for 20 hours. The resulting gel was released from the mold, washed with ethanol, and dried, to obtain a solvent-free, crosslinked body A-6.

Example 7

Preparation of Crosslinked Body A-7 Comprising HAPR35-g-PCL and Siloxane 1000 Having Isocyanate Groups 1 g of HAPR35-g-PCL obtained in Synthetic Example 2 was dissolved in 2 ml of toluene. 1.5 ml of the siloxane 1000 having isocyanate groups obtained in Synthetic Example 6 was added followed by addition of 5 µl of dibutyl tin dilaurate as a catalyst. Using a 10 mil applicator, the solution was coated onto a glass plate. The coated glass plate was kept on a hot plate at 90° C. for 15 minutes. After cooling for 2 hours or more, the coated film was scraped off from the glass plate, to obtain a solvent-free, crosslinked body A-7.

Example 8

Preparation of Crosslinked Body A-8 Comprising E2APR35-g-PCL and Polypropylene Glycol Having Isocyanate Groups 0.7 g of E2APR35-g-PCL obtained in Synthetic Example 3 was dissolved in 1.3 ml of DMF, and thereto 0.4 g of polypropylene glycol of which terminal is modified with tolylene 2,4-diisocyanate (Mn=2300, Aldrich Co.) was added and mixed. After removing the air bubble by ultrasonication or reducing the pressure, the mixture was flowed into a sample mold and maintained at 60° C. for 20 hours and 40° C. for 20 hours. The resulting gel was released from the mold, washed with ethanol, and dried, to obtain a solvent-free, crosslinked body A-8.

Example 9

Preparation of Crosslinked Body A-9 Comprising GAPR35-g-PCL and Polypropylene Glycol Having Isocyanate Groups 0.7 g of GAPR35-g-PCL obtained in Synthetic Example 4 was dissolved in 1.3 ml of xylene, and thereto 0.4 g of polypropylene glycol of which terminal is modified with tolylene 2,4-diisocyanate (Mn=2300, Aldrich Co.) was added and mixed. After removing the air bubble by ultrasonication or reducing the pressure, the mixture was flowed into a sample mold and maintained at 60° C. for 20 hours and 40° C. for 20 hours. The resulting gel was released from the mold, washed with ethanol, and dried, to obtain a solvent-free, crosslinked body A-9.

Example 10

Preparation of Crosslinked Body A-10 Comprising HAPR35-g-P(CL-MBL) and Polypropylene Glycol Having Isocyanate Groups A solvent-free, crosslinked body A-10 was obtained in a manner similar to Example 9, except that "GAPR35-g-PCL" used in Example 9 was replaced with HAPR35-g-P(CL-MBL) obtained in Synthetic Example 5.

Example 11

Preparation of Crosslinked Body A-11 Comprising HAPR35-g-PCL, Polyethylene Glycol Diol and a Group Derived from an Isocyanurate Product of Hexamethylene Diisocyanate 1.35 g of HAPR35-g-PCL and 0.15 g of polyethylene glycol diol (Mn=4000, Wako Pure Chemical Industries, Ltd.) were dissolved in 7.5 ml of toluene and added with 0.43 g of an isocyanurate product of hexamethylene diisocyanate (trade name: H-2523, Nippon Bee Chemical Co., Ltd.). After removing the air bubble by ultrasonication or reducing the pressure, the mixture was flowed into a sample mold and maintained at 60° C. for 20 hours. The resulting gel was released from the mold and dried, to obtain solvent-free, crosslinked body A-11.

Example 12

Preparation of Crosslinked Body A-12 Comprising HAPR35-g-PCL, Polyethylene Glycol Diol, Polyethylene Glycol Monomethyl Ether and a Group Derived from an Isocyanurate Product of Hexamethylene Diisocyanate 1.35 g of HAPR35-g-PCL, 0.075 g of polyethylene glycol diol (Mn=1000, Wako Pure Chemical Industries, Ltd.) and 0.075 g of polyethylene glycol monomethyl ether (Mn=1100, Wako Pure Chemical Industries, Ltd.) were dissolved in 7.5 ml of DMF and added with the 0.12 g of an isocyanurate product of hexamethylene diisocyanate (H-2523, Nippon Bee Chemical Co., Ltd.). After removing the air bubble by ultrasonication or reducing the pressure, the mixture was flowed into a sample mold and maintained at 60° C. for 20 hours. The resulting gel was released from the mold, washed with toluene, and dried, to obtain solvent-free, crosslinked body A-12.

Example 13

Preparation of Crosslinked Body A-13 Comprising HAPR35-g-PCL, Polypropylene Glycol Diol and a Group Derived from an Isocyanurate Product of Hexamethylene Diisocyanate 1.35 g of HAPR35-g-PCL and 0.15 g of polypropylene glycol diol (Mn=1000, Wako Pure Chemical Industries, Ltd.)

were dissolved in 7.5 ml of DMF and added with the 0.12 g of an isocyanurate product of hexamethylene diisocyanate (H-2523, Nippon Bee Chemical Co., Ltd.). After removing the air bubble by ultrasonication or reducing the pressure, the mixture was flowed into a sample mold and maintained at 60° C. for 20 hours. The resulting gel was released from the mold, washed with toluene, and dried, to obtain solvent-free, crosslinked body A-13.

Example 14

Preparation of Crosslinked Body A-14 Comprising HAPR35-g-PCL, Polypropylene Glycol Diol and a Group Derived from an Isocyanurate Product of Hexamethylene Diisocyanate A solvent-free, crosslinked body A-14 was obtained in a manner similar to Example 13, except that the Mn of polypropylene glycol diol was changed from 1000 to 3000 (Wako Pure Chemical Industries, Ltd.) and also the amount of the isocyanurate product of hexamethylene diisocyanate was changed to 0.43 g.

Comparative Example 1

Crosslinked Body Formed of APR35 and 1,4-Butanediol Diglycidyl Ether 1.0 g of APR35 was dissolved in 5.0 ml of 1 N NaOH aqueous solution and 0.2 g of 1,4-butanediol diglycidyl ether (manufactured by Tokyo Chemical Industry, Co., Ltd.) were added and mixed. After removing the air bubble by ultrasonication or reducing the pressure, the mixture was flowed into a sample mold and maintained at 40° C. for 20 hours. The resulting gel was released from the mold, washed with water, and dried, to obtain solvent-free, crosslinked body C-1.

Comparative Example 2

Water-Containing Crosslinked Body Formed of APR35 and 1,4-Butanediol Diglycidyl Ether A crosslinked body was obtained in a manner similar to Comparative Example 1, and washed with water without drying, to obtain water-containing crosslinked body C-2 that is preserved in water.

Comparative Example 3

Crosslinked Body Formed of E2-HAPR35 and Hexamethylene Isocyanate 200 mg of E2-HAPR35 was dissolved in 1.0 ml of dimethyl sulfoxide (DMSO), 5 μl of hexamethylene diisocyanate was added thereto, and maintained at 60° C. for 20 hours. The resulting gel was released from the mold, washed with water, and dried, to obtain solvent-free, crosslinked body C-3.

Example 15

Viscoelasticity at 20° C. was measured for the crosslinked bodies A-1 to A-14 (Examples 1 to 14) and the crosslinked bodies C-1 to C-3. The measurement of viscoelasticity was carried out by using a tensile tester, Texture analyzer plus XTPL/1. The measurement was carried out with a sample sheet having a sample size of 4.0 mm×30 mm×thickness of 0.5 to 1.0 mm. Furthermore, the effective sample size was 4.0 mm×10 mm×thickness of 0.5 to 1.0 mm. The tensile rate was 0.2 mm/s.

Figure 2:
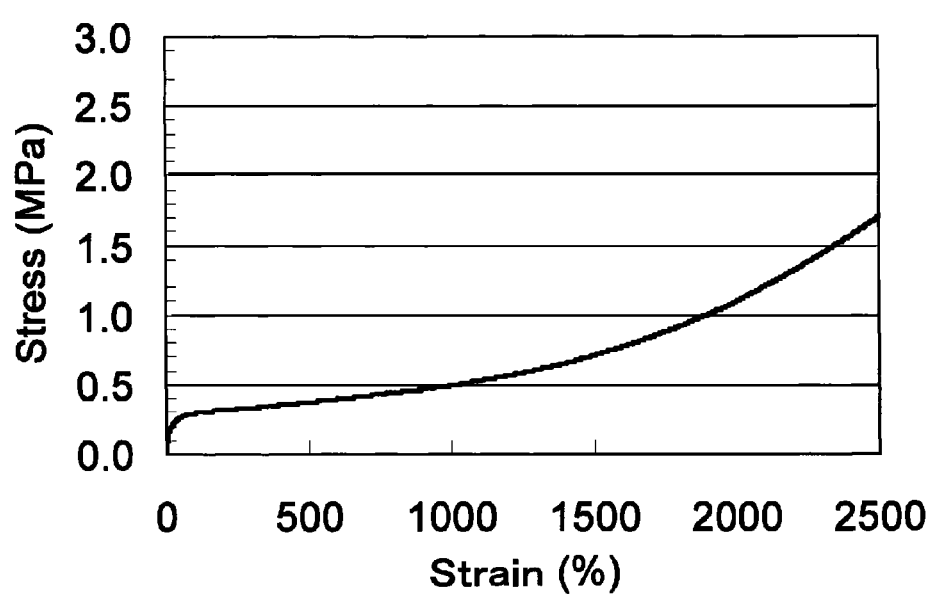
FIG. 2 shows stress-strain curve resulting from the viscoelacticity measurement of a crosslinked body A-2.
Figure 3:
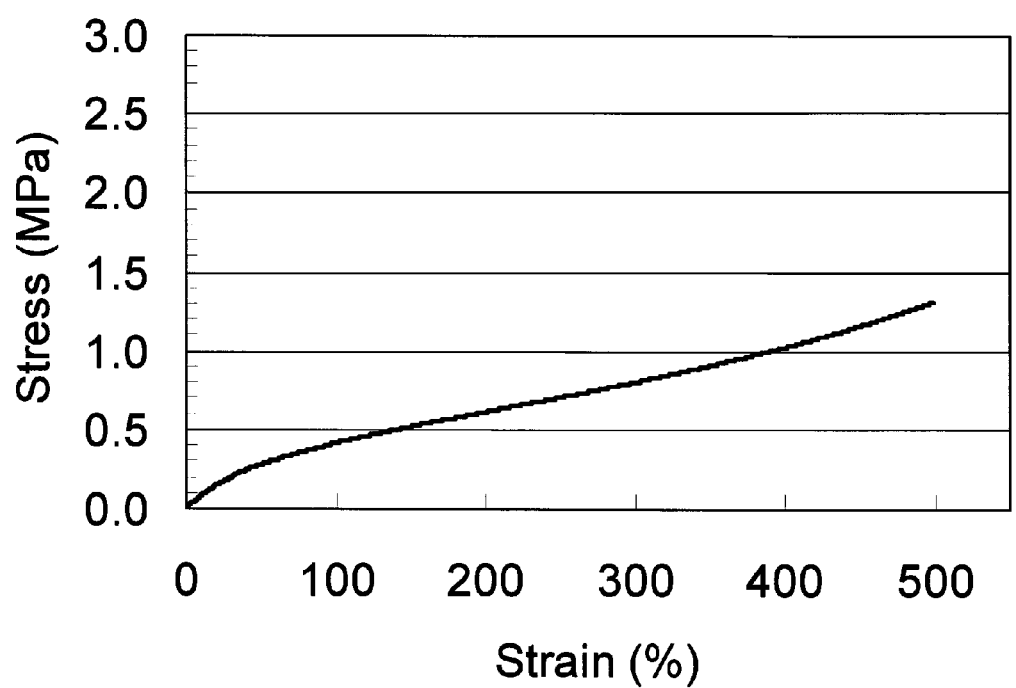
FIG. 3 shows stress-strain curve resulting from the viscoelacticity measurement of a crosslinked body A-6.

The stress-strain curve, which is a result of the viscoelasticity measurement of crosslinked body A-2, is shown in FIG. 2. Further, the stress-strain curve for crosslinked body A-6 is shown in FIG. 3.

Furthermore, for crosslinked body A-6, the viscoelasticity at 45° C. was also measured. The measurement results are showed in Tables 1 and 2.

TABLE 1

Viscoelasticities of Crosslinked Bodies A-1 to A-15, and Crosslinked Bodies C-1 and C-2

| Crosslinked Body | δ50 (MPa) | δ100 (MPa) | ΔS | Breaking Extension Ratio (%) |
|---|---|---|---|---|
| A-1 | 0.28 | 0.32 | 0.14 | 2500 |
| A-2 | 0.26 | 0.29 | 0.12 | 2500 |
| A-3 | 0.44 | 0.46 | 0.045 | 2300 |
| A-4 | 0.15 | 0.17 | 0.13 | 2500 |
| A-5 | 0.10 | 0.12 | 0.2 | 2400 |
| A-6 | 0.29 | 0.43 | 0.48 | 498 |
| A-7 | 1.4 | 2.3 | 0.64 | 145 |
| A-8 | 0.50 | 0.62 | 0.24 | 450 |
| A-9 | 0.30 | 0.43 | 0.43 | 420 |
| A-10 | 0.23 | 0.35 | 0.52 | 460 |
| A-11 | 0.95 | 1.43 | 0.51 | 148 |
| A-12 | 1.2 | 1.9 | 0.58 | 180 |
| A-13 | 1.6 | 2.5 | 0.56 | 190 |
| A-14 | 0.75 | 1.2 | 0.67 | 130 |
| C-1 | Impossible to measure (fragile) | Impossible to measure (fragile) | — | Impossible to measure (fragile) |
| C-2 | 0.030 | 0.045 | 0.44 | 380 |
| C-3 | Impossible to measure (hard) | Impossible to measure (hard) | — | Impossible to measure (hard) |

TABLE 2

Viscoelasticities of Crosslinked Body A-6

| Measurement Temperature ° C. | δ50 (MPa) MPa | δ100 (MPa) MPa | ΔS | Breaking Extension Ratio % |
|---|---|---|---|---|
| 20 | 0.29 | 0.43 | 0.48 | 498 |
| 45 | 0.29 | 0.43 | 0.48 | 462 |

Table 1 shows that the crosslinked bodies A-1 to A-15 (Examples 1 to 15) have stress-strain characteristics with a wide low stress region, and also have the viscoelasticity having the extension ratio of 100% or more. Meanwhile, the crosslinked bodies C-1 and C-3 (Comparative Examples 1 and 3) were either too fragile or too hard, thus the viscoelasticity cannot be measured in a solvent-free state.

More, Table 1 also shows that the "water-containing" crosslinked body (C-2), which is produced by using a well-known low molecular weight crosslinking agent, may have a wide low stress region, but the crosslinked body C-1 which is obtained by "removing water" from the crosslinked body C-2 is a material which is either too fragile or too hard, thus the viscoelasticity cannot be measured.

Table 2 shows that, even when the measurement temperature was changed from 20° C. to 45° C., the stress-strain characteristics with a wide low stress region are still obtained and also the breaking extension ratio hardly changes.

What is claimed is:

1. A method for producing a material comprising a first polyrotaxane and a second polyrotaxane, wherein the first and second polyrotaxanes are crosslinked with each other, the material is free from solvent, and the material has a stress at 50% strain (δ50) of 2.0 MPa or less;

the method comprising the steps of:

a) preparing the first polyrotaxane, wherein the first polyrotaxane comprises a first pseudopolyrotaxane, which has a first linear molecule and a first cyclic molecule(s) in which the first linear molecule is included in a cavity of each of the first cyclic molecule(s) in a skewered manner, and first capping groups, each of which locates at each end of the first pseudopolyrotaxane in order to prevent the dissociation of the first cyclic molecule(s), the first cyclic molecule has a first active group, and the first linear molecule is polyethylene glycol;

b) preparing the second polyrotaxane, wherein the second polyrotaxane comprises a second pseudopolyrotaxane, which has a second linear molecule and a second cyclic molecule(s) in which the second linear molecule is included in a cavity of each of the second cyclic molecule(s) in a skewered manner, and second capping groups, each of which locates at each end of the second pseudopolyrotaxane in order to prevent the dissociation of the second cyclic molecule(s), the second cyclic molecule has a second active group, and the second linear molecule is polyethylene glycol; and c) mixing and reacting i) the first polyrotaxane; ii) the second polyrotaxane; and iii) a crosslinking compound, which has a first reactive group and a second reactive group, each of which is reactive with the first and second active groups, respectively, and which has a polymeric moiety comprising repeating units of 10 or more between the first and second reactive groups, to obtain the material.

2. A method for producing a material comprising a first polyrotaxane and a second polyrotaxane, wherein the first and second polyrotaxanes are crosslinked with each other, the material is free from solvent, and the material has a stress at 50% strain (δ50) of 2.0 MPa or less;

the method comprising the steps of:

a) preparing the first polyrotaxane, wherein the first polyrotaxane comprises a first pseudopolyrotaxane, which has a first linear molecule and a first cyclic molecule(s) in which the first linear molecule is included in a cavity of each of the first cyclic molecule(s) in a skewered manner, and first capping groups, each of which locates at each end of the first pseudopolyrotaxane in order to prevent the dissociation of the first cyclic molecule(s), the first cyclic molecule has a first active group, and the first linear molecule is polyethylene glycol;

b) preparing the second polyrotaxane, wherein the second polyrotaxane comprises a second pseudopolyrotaxane, which has a second linear molecule and a second cyclic molecule(s) in which the second linear molecule is included in a cavity of each of the second cyclic molecule(s) in a skewered manner, and second capping groups, each of which locates at each end of the second pseudopolyrotaxane in order to prevent the dissociation of the second cyclic molecule(s), the second cyclic molecule has a second active group, and the second linear molecule is polyethylene glycol; and c) mixing and reacting i) the first polyrotaxane; ii) the second polyrotaxane; and iii) a crosslinking compound, which has a first reactive group and a second reactive group, each of which is reactive with the first and second active groups, respectively, and which has a polymeric moiety having number average molecular weight of 1,000 or more between the first and second reactive groups, to obtain the material.

3. The method according to claim 1, wherein the material has a stress at 100% strain (δ100) of 2.5 MPa or less.

4. The method according to claim 2, wherein the material has a stress at 100% strain (δ100) of 2.5 MPa or less.

5. The method according to claim 1, wherein the material has breaking extension ratio of more than 100%.

6. The method according to claim 2, wherein the material has breaking extension ratio of more than 100%.

7. The method according to claim 1, wherein the polymeric moiety is polyether, polyester, polysiloxane, polycarbonate, poly(meth)acrylate or polyene, or copolymer thereof.

8. The method according to claim 2, wherein the polymeric moiety is polyether, polyester, polysiloxane, polycarbonate, poly(meth)acrylate or polyene, or copolymer thereof.

9. The method according to claim 1, wherein the active group is derived from an —OH group, the reactive group or the functional group is an isocyanate group, the polymeric moiety is polyether, polyester or polysiloxane.

10. The method according to claim 2, wherein the active group is derived from an —OH group, the reactive group or the functional group is an isocyanate group, the polymeric moiety is polyether, polyester or polysiloxane.

11. The method according to claim 1, further comprising a step of producing the crosslinking compound, wherein the step of producing the crosslinking compound comprises a step of reacting a polymer having a site to which a reactive group may be added with a compound having at least two reactive groups, to obtain the crosslinking compound.

12. The method according to claim 2, further comprising a step of producing the crosslinking compound, wherein the step of producing the crosslinking compound comprises a step of reacting a polymer having a site to which a reactive group may be added with a compound having at least two reactive groups, to obtain the crosslinking compound.

13. The method according to claim 1, further comprising a step of producing the crosslinking compound, wherein the step of producing the crosslinking compound comprises a step of producing a polymeric moiety by polymerizing a monomer, and during the step, imparting a compound which becomes the reacting group.

14. The method according to claim 2, further comprising a step of producing the crosslinking compound, wherein the step of producing the crosslinking compound comprises a step of producing a polymeric moiety by polymerizing a monomer, and during the step, imparting a compound which becomes the reacting group.

* * * * *